United States Patent [19]
Kelderhouse et al.

[11] Patent Number: 5,229,884
[45] Date of Patent: Jul. 20, 1993

[54] KALEIDOSCOPE ASSEMBLY

[76] Inventors: Ann M. Kelderhouse; Charles D. Kelderhouse, both of 1859 Kenion Point, Snellville, Ga. 30278

[21] Appl. No.: 877,411

[22] Filed: May 1, 1992

[51] Int. Cl.5 .............................................. G02B 23/00
[52] U.S. Cl. ..................................................... 359/616
[58] Field of Search ................................ 359/616, 617

[56] References Cited

U.S. PATENT DOCUMENTS

| | | | |
|---|---|---|---|
| 2,447,623 | 8/1948 | Zemelman | 359/617 |
| 2,991,689 | 7/1961 | Taylor | 359/617 |
| 3,884,547 | 5/1975 | Parrino | 359/617 |
| 3,923,368 | 12/1975 | Hassel | 359/616 |
| 4,494,820 | 1/1985 | Klawitter | 359/612 |
| 4,732,439 | 3/1988 | Chioffe | 359/616 |
| 4,762,380 | 8/1988 | MacCarthy | 359/616 |
| 5,029,954 | 7/1991 | Eilrich et al. | 359/617 |

Primary Examiner—Richard A. Wintercorn
Attorney, Agent, or Firm—Deveau, Colton & Marquis

[57] ABSTRACT

A kaleidoscope kit for assembly by the user into a personalized kaleidoscope having a hollow eye piece barrel in which a personalized photograph or a design sheet may be inserted, a mirror configuration for insertion into the hollow tubular barrel, a connector piece which is releasably secured by friction and by pressure tabs to the hollow tubular barrel, a view cup which is releasably secured to the connector piece, such that objects to be viewed can be chosen and substituted by the user within the view cup, the connector piece having a transparent interior wall preventing communication between the view cup and the hollow tubular barrel.

14 Claims, 3 Drawing Sheets

KALEIDOSCOPE ASSEMBLY

BACKGROUND OF THE INVENTION

1. Field of the Invention

This invention relates generally to the field of kaleidoscopes and more specifically to a kaleidoscope kit which can be assembled by the user, comprising a barrel tube having an eye piece and mirror system, a viewing cup, and a connecting member for connecting the barrel to the viewing cup.

2. Prior Art

Kaleidoscopes have been around for many years and generally, at a minimum, comprise an elongated tubular body having an eye opening at one end and a transparent or translucent screen at the other end. Within the tubular body is a system of mirrors, typically a V-shaped system, proximate to the eye opening, and a collection of objects proximate to the transparent or translucent end. The mirror configuration is arranged within the tubular body between the eye opening and the translucent or transparent end such that a viewer, when peering through the eye opening, views along and through the mirror configuration toward the translucent or transparent end and views the objects. As the viewer peers through the eye opening along the mirror configuration, the viewer is presented with a generally 180° view field filled, in part, by a view of the objects and the reflected images of the objects in the mirror configuration. As the kaleidoscope is rotated, the objects tumble over one another, presenting the viewer an infinite variety of view fields.

Many variations and improvements have been developed on this basic kaleidoscope design. For example, in the patent issued to Parrino, U.S. Pat. No. 3,884,547, a separate compartment comprising the translucent or transparent end and the objects is rotatably secured to a tubular body comprising the eye opening and mirror system. In this manner, the tubular body can be held rotationally stable, while the compartment comprising the translucent or transparent end and the objects can be rotated. Additionally, the invention disclosed in U.S. Pat. No. 3,884,547 comprises a storage compartment for storing additional objects, which storage compartment frictionally attaches to the eye opening end of the kaleidoscope.

Another twist on the kaleidoscope assembly is disclosed in the patent to Klawitter, U.S. Pat. No. 4,494,820, which comprises a separate mechanism for rotating the objects within the kaleidoscope. The improvement disclosed in U.S. Pat. No. 4,494,820 comprises a sleeve-like object enclosure which fits within the barrel of the kaleidoscope, which enclosure comprises a gear mechanism cooperating with a rotational manual actuating means having an axis normal to the axis of the kaleidoscope barrel. This rotatable manual actuating means gearing system cooperates with the gear means on the enclosure, such that when the rotatable manual actuating means is rotated, the enclosure rotates within the kaleidoscope barrel.

The interactive kaleidoscope disclosed in the patent to MacCarthy, U.S. Pat. No. 4,762,380, comprises the general kaleidoscope configuration, both having a translucent screen, attached to the end of the kaleidoscope opposite of the eye opening, which is translatable in a plane orthogonal to the longitudinal axis of the kaleidoscope. Further, the end of the kaleidoscope comprising the translucent screen is rotatable relative to the main body of the kaleidoscope. Various designs can be created by the user on the translucent screen, such that when the end of the kaleidoscope comprising the translucent screen is rotatable relative to the main body of the kaleidoscope. Various designs can be created by the user on the translucent screen, such that when the end of the kaleidoscope comprising the translucent screen is rotated, the design on the translucent screen acts as the kaleidoscope image.

A further twist in the kaleidoscope art is disclosed in the patent to Eilrch et. al., U.S. Pat. No. 5,029,954, which substitutes a translucent elongated object tube having a closed off interior filled with a clear transparent viscous fluid having a plurality of discrete particles floating therein (for the objects). The elongated object tube is inserted through holes in the body of the kaleidoscope such that the longitudinal axis of the elongated object tube is normal to the longitudinal axis of the kaleidoscope. As the kaleidoscope is rotated about its longitudinal axis, the particles in the fluid in the elongated object tube move, presenting the viewer with the kaleidoscope view field.

Further, various do-it-yourself kits for making kaleidoscopes have been developed. One such kit is disclosed in the patent to Hassel, U.S. Pat. No. 3,923,368. The kaleidoscope disclosed in U.S. Pat. No. 3,923,368 can be assembled from a single blank sheet of material having a reflective surface, producing the mirror configuration. When the blank sheet of material is cut and configured, the viewed can look down the body formed and the view field, comprising whatever scenery the viewed happens to be pointing the kaleidoscope toward, will be reflected on the mirrored surface.

A second kit assembly for producing a kaleidoscope is disclosed in the patent to Chioffe, U.S. Pat. No. 4,732,429. The kit disclosed in U.S. Pat. No. 4,732,439 comprises a container forming the kaleidoscope body, a reflecting means, and a rotatable means for holding a picture at the end of the kaleidoscope body. As the rotatable means with the picture is rotated, the picture is reflected in the reflecting means, thus producing the kaleidoscope image in the view field.

Although the prior art discloses many different types and configurations of kaleidoscopes, the prior art generally is concerned with entire kaleidoscope assemblies, and not with the development of novel subparts for constructing the kaleidoscope. As discussed above, most kaleidoscope parts either are fastened together in some permanent fashion, or are frictionally secured together. The prior art also does not disclose a simplified kaleidoscope kit for assembly by the user which comprises a barrel assembly having an eye opening and containing a mirror configuration, and a view cup which is releasably secured to the kaleidoscope barrel.

BRIEF SUMMARY OF THE INVENTION

The connector piece disclosed and claimed herein allows for the securing together of various parts of a kaleidoscope, specifically a barrel and a view cup, in such a fashion that permanent fastening of the component parts is unnecessary. Additionally, the unique design of the connector piece prevents commingling of the objects to be viewed with the mirror configuration, while still allowing interchanging of the objects to be viewed and personalization of a kaleidoscope by insertion of personalized objects within the kaleidoscope.

The connector piece preferably is a cylindrical clear plastic part having a raised collar extending radially outward from the circumference of the outer surface of the connector piece, and a clear plastic wall across the interior of the connector piece prohibiting communication through the interior of the connector piece. The outer surface of the connector piece has one or more pressure tabs which frictionally engage other components of the kaleidoscope, thus holding the various components together as a single kaleidoscope unit. The radial collar also prevents the various components of the kaleidoscope from interacting in an inappropriate manner; specifically, it prevents the view cup from overlapping the barrel, and vice versa. The clear wall prevents communication between the various kaleidoscope components, and is especially useful in preventing the objects to be viewed from exiting the viewing cup and entering the mirror configuration area.

The connector piece disclosed and claimed herein is one component in a do-it-yourself kaleidoscope kit comprising the connector piece. The present kaleidoscope can be personalized in at least two ways. First, the kaleidoscope barrel may be constructed of a transparent material such that the user can insert a sheet of paper, such as a photograph, around the cylindrical wall of the barrel, such that the image on the sheet of paper faces radially outward. Second, any desired objects may be placed in the view cup, which is releasably secured to the barrel by the connecting piece. Second, any desired objects may be placed in the view cup, which is releasably secured to the barrel by the connecting piece. Additionally, while the novel connector piece allows for the easy, but secure, connection of the barrel to the view cup, it prevents the objects in the view cup from entering the barrel.

Accordingly, it is an object of the present invention to provide a do-it-yourself kaleidoscope kit comprising a personalizable eye piece barrel containing a mirror configuration, a view cup which can be individualized by the user with selected viewing objects, and a connector means for releasably securing the eye piece barrel to the view cup.

It is another object of the present invention to provide a kaleidoscope which allows for the interchanging of various designs visible to the public on the eye piece barrel.

Yet another object of the present invention is to provide a kaleidoscope having a view cup in which the user can interchange objects to be viewed simply and easily.

Still another object of the present invention is to provide a connector piece for a kaleidoscope for allowing an eye piece barrel to be releasably secured to a view cup such that the kaleidoscope can be presented as an assembly kit.

Another object of the present invention is to provide a do-it-yourself kaleidoscope kit which is inexpensive to manufacture, simple to construct, durable in construction and easy to use by the user.

These objects, and other objects, features and advantages, of the present invention will become more apparent to one skilled in the art when the following Detailed Description of a Preferred Embodiment is read in conjunction with the appended Figures in which like reference characters depict like component throughout the several views.

DETAILED DESCRIPTION OF A PREFERRED EMBODIMENT

Figure 4:
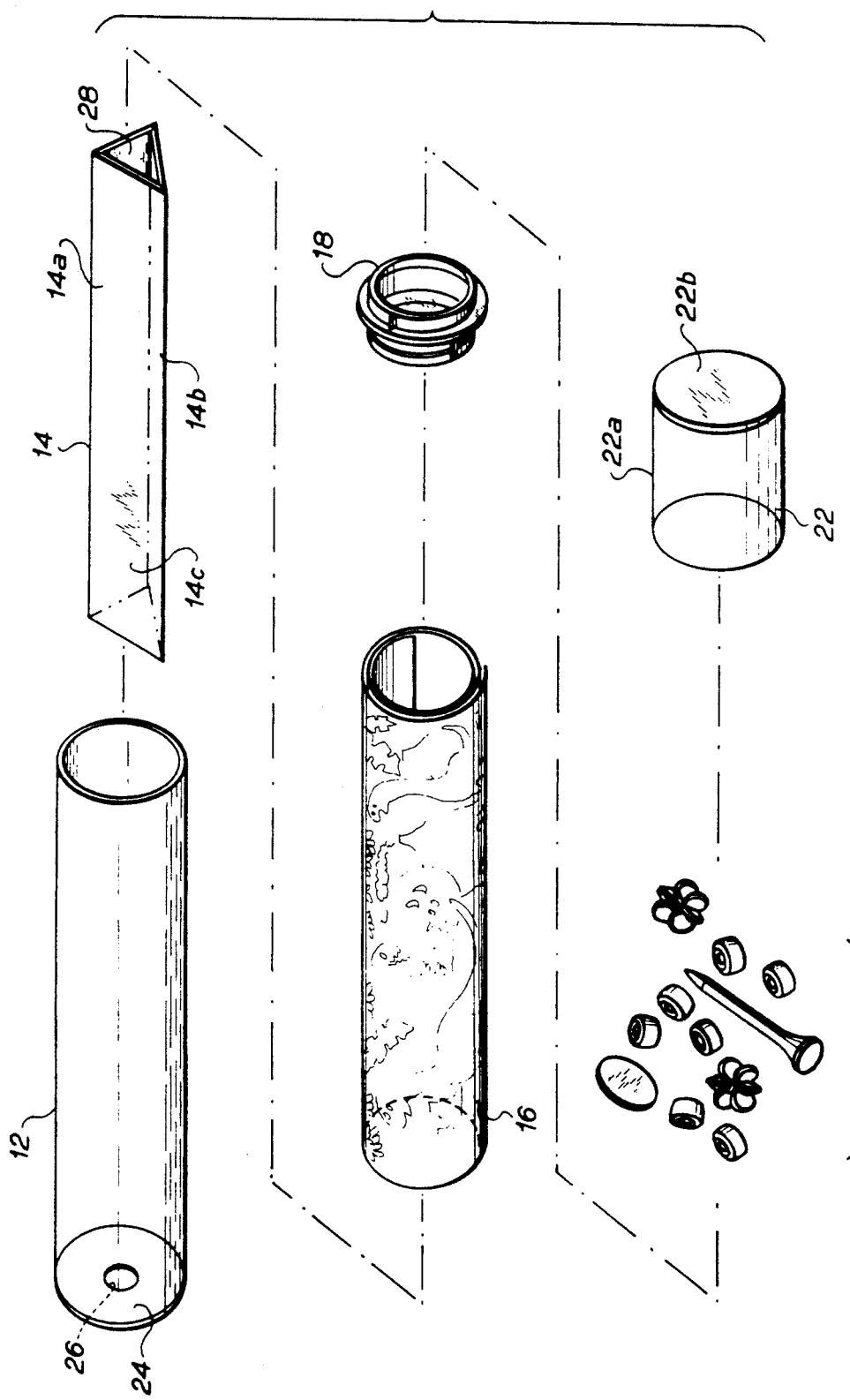
FIG. 4 is an exploded view of a kaleidoscope according to the present invention.
Figure 5:
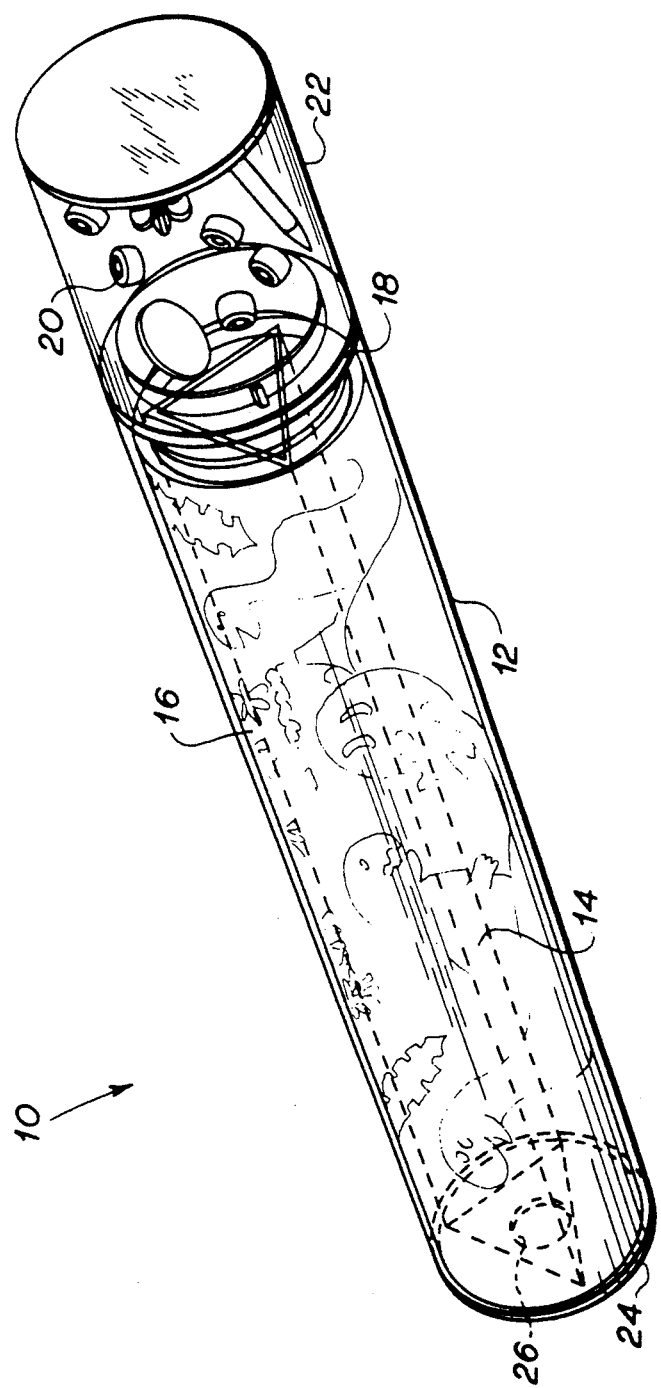
FIG. 5 is an isometric view of the constructed kaleidoscope as shown in FIG. 4.

Referring first to FIGS. 4 and 5, the kaleidoscope 10 constructed according to the present invention comprises a tubular barrel 12, a mirror assembly 14, an interchangeable barrel design sheet 16 supplied by the assembler, a connector piece 18, viewing objects 20 also supplied by the user, and a view cup 22. The various components are assembled by the user resulting in the kaleidoscope shown in FIG. 5.

Tubular barrel 12 is a generally cylindrical hollow structure having a closed proximal end 24 and an open distal end opposite the proximal end 24. Proximal end 24 has an eye opening 26 therethrough, allowing visual communication therethrough to the interior of the barrel 12, through which the viewer peers when using the kaleidoscope. Mirror configuration 14 generally is a triangular or prismatic configuration having a central viewing channel with a triangular cross-section extending along the interior length of the configuration 14. The configuration 14 has a mirrored interior 28 corresponding to the interior surfaces of generally rectangularly shaped mirrors 14a, 14b, 14c. Triangular ends of the mirror configuration 14 are open such that the line of sight from eye opening 26 through mirror configuration 14 is uninterrupted.

The barrel 12 can have a design already imprinted on the outer surface of the barrel, can have no design, can be opaque, or can be constructed from a transparent material. If a transparent material is used, design sheet 16 may be inserted into the barrel 12 such that a design on one surface of design sheet 16 can be seen through the transparent barrel material. The design sheet 16 is supplied by the user and is cut to the proper size, the length and width of design sheet 16 corresponding to the length and circumference of the barrel 12.

Mirror configuration 12 is of such a size and construction that it has approximately the same length as barrel 12 and fits snugly within barrel 12. Each of the three edges of the prismatic configuration created by the adjoining mirror sides 14a, 14b, 1c contacts the inner surface of the barrel 12, or the inner surface of design sheet 16. Typically, the mirror sides 14a, 14b, 1c are identical in size and, when properly configured, create 60° interior angles relative to each other. Thus, common 5 edges of mirror sides 14a, 14b, 1c contact the inner surface of barrel 12, or design sheet 16, approximately ⅓ of the way around the circumference of barrel 12.

View cup 22 is a generally cylindrical, hollow, cup-like structure made from a translucent or transparent material. Cup 22 has a generally cylindrical body 22a which is closed at one end by end wall 22b. The end of view cup 22 opposite end wall 22b is open. Objects 20 to be viewed are to be placed in view cup 22. The objects 20 to be viewed are selected by the user.

Figure 1:
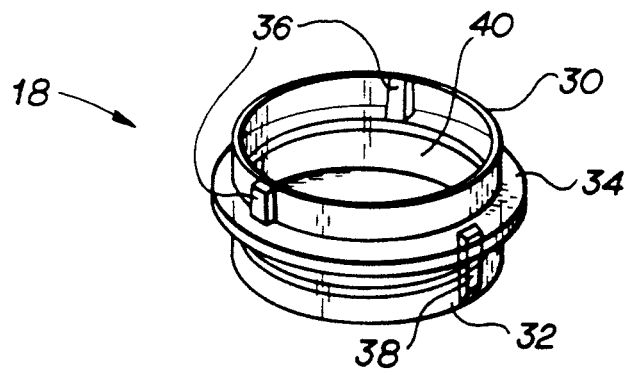
FIG. 1 is an isometric view of the connector piece of the present invention.
Figure 2:
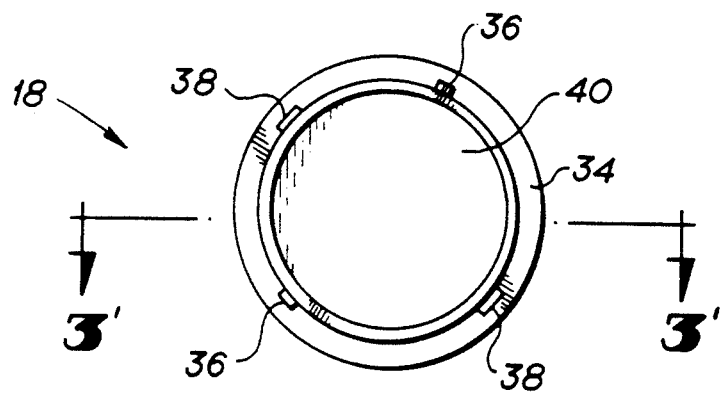
FIG. 2 is a top view of the connector piece shown in FIG. 1.
Figure 3:
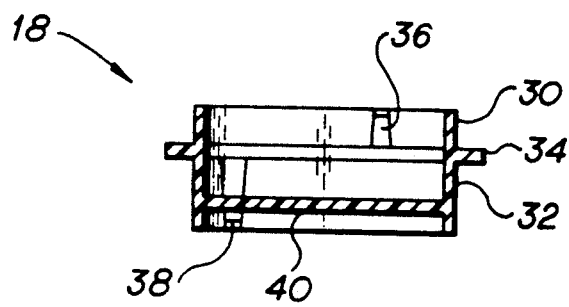
FIG. 3 is a sectional side view of the connector piece shown in FIG. 2 through line 3'—3'.

Referring now to FIGS. 1, 2 and 3, connector piece 18 is shown in detail. Connector piece 18 comprises barrel frictional surface 30, view cup frictional surface 32, collar 34, barrel pressure tabs 36, view cup pressure tabs 38, and separator wall 40. Connector piece 18 typically is manufactured entirely from a clear material, but at a minimum, separator wall 40 must be manufactured from a clear material. Connector piece 18 is a generally hollow cylindrical structure having an outer surface and an inner surface and open ends. Collar 34 extends radially outward from, and is located generally central along, the circumference of the outer surface of connector piece 18. Collar 34 may be offset slightly angularly and/or longitudinally along the outer surface of connector piece 18 toward one end depending upon, for example, the materials of construction of barrel 12 and view cup 22 and the amount of frictional area needed to secure the components of the kaleidoscope 10 frictionally to each other. Collar 34 divides the outer surface of connector piece 18 into barrel frictional surface 30 and view cup frictional surface 32.

Barrel pressure tabs 36 are located on the outer surface of barrel frictional surface 30, and view cup pressure tabs 38 are located on the outer surface of view cup frictional surface 32. As discussed below, barrel pressure tabs 36 provide additional means for frictionally engaging the connector piece 18 within the barrel 12, and view cup pressure tabs 38 provide additional means for engaging connector piece 18 with the view cup 22. Transparent wall 40 is a generally circular wall located in the interior of connector piece 18 and prevents communication of the objects 20 or the mirror configuration 14 or the design sheet 16 through the interior of connector piece 18. Transparent wall 40 extends across the entire circular cross-section of connector piece 18 and, when connector piece 18 is inserted correctly between barrel 12 and view cup 22, acts as an end wall for both barrel 12 and view cup 22. Transparent wall 40 is located centrally within the interior of connector piece 18, but can be offset slightly toward one end.

Connector piece 18 fits generally within the interiors of barrel 12 and view cup 22. Barrel frictional surface 30 is placed in a removable snug-fitting engagement with the inner surface of barrel 12, with barrel pressure tabs 36 assisting in holding connector piece 18 within barrel 12. The outside diameter of connector piece 18 through barrel pressure tabs 36 or view cup pressure tabs 38 is greater than the inside diameter of barrel 12. Thus, barrel pressure tabs 36 and view cup pressure tabs 38 provide radial pressure against barrel 12 and view cup 22, respectively, thus effectively creating an interference fit between barrel 12 and view cup 22 and connector piece 18 so as to help ensure that kaleidoscope 10 does not fall apart into its various components after assembly. Collar 24 acts as a shoulder preventing connector piece 18 from sliding all the way into barrel 12. Connector piece 18 also prevents mirror configuration 14 and design sheet 16 from significant movement within barrel 12, from falling out of barrel 12, or from entering view cup 22.

View cup 22, with objects 20 therein, is positioned over the view cup frictional surface 32 of connector piece 18. In a manner similar to that discussed in connection with engaging connector piece 18 to barrel 12, view cup frictional surface 32 frictionally engages in a removable snug-fitting relationship with the interior surface of view cup 22. View cup pressure tabs 38 assist in securing view cup 22 to connector piece 18. Collar 34 acts as shoulder preventing view cup 22 from sliding all the way over connector piece 18. Transparent wall 40 prevents the objects 20 from leaving view cup 22 and entering barrel 12.

In operation, the user can select any design sheet 16, such as a photograph of a child, to place first within barrel 12. Mirror configuration 14 then is inserted into barrel 12 and design sheet 16 and mirror configuration 14 are secured in place by way of connector piece 18. Objects 20 are placed within view cup 22 and view cup 22 is secured over connector piece 18. Thus, a kaleidoscope assembly is easily and quickly constructed. The viewer then looks through eye opening 22 longitudinally down the length of the kaleidoscope from the eye opening 26 end through mirror configuration 14 and into view cup 22. As the kaleidoscope 10 is rotated, objects 20 tumble within view cup 22, thus creating an infinite variety of images creating the kaleidoscope field. The objects 20 and design sheet 16 can be changed at will by the user.

The above description of a preferred embodiment has been given for example purposes only and is not intended to limit the scope and spirit of the invention or its equivalents, as defined in the claims.

What is claimed is:

1. A connector piece for use in assembling a kaleidoscope having an elongated tubular body having an eye opening therethrough, a mirror configuration therein, and a view cup for containing objects to be viewed, said connector piece comprising:
   (a) a generally cylindrical tubular body having a hollow interior, an interior surface and an exterior surface;
   (b) a collar extending radially outward from the circumference of said exterior surface of said tubular body, said collar dividing said exterior surface into a first frictional surface and a second frictional surface;
   (c) at least one pressure tab located on each of said first frictional surface and said second frictional surface; and
   (d) a wall extending across said hollow interior preventing communication of the objects to be viewed through said hollow interior of said connector piece.

2. The connector piece as claimed in claim 1, comprising two of said pressure tables on each of said first frictional surface and said second frictional surface.

3. The connector piece as claimed in claim 1, wherein said connector piece is constructed of a material selected from the group consisting of transparent and translucent materials.

4. The connector piece as claimed in claim 1, wherein said pressure tabs extend radially outwardly from said frictional surfaces.

5. The connector piece as claimed in claim 2, wherein said pressure tabs extend radially outwardly from said frictional surfaces and said pressure tabs located on said first frictional surface are located opposite each other relative to said hollow interior of said connector piece and said pressure tabs located on said second frictional surface are located opposite each other relative to said hollow interior of said connector piece.

6. The connector piece as claimed in claim 5, wherein said pressure tabs located on said first frictional surface are angularly offset from said pressure tabs located on said second frictional surface.

7. A kaleidoscope assembly comprising:
(a) an elongated tubular body having an inner surface, an outer surface, a generally closed proximal end having an eye opening therethrough and an open distal end;
(b) a mirror configuration insertable within said elongated tubular body;
(c) a generally cylindrical hollow view cup for containing objects to be viewed having an interior surface, an exterior surface, a closed distal end, and an open proximal end; and
(d) a connector piece releasably securable to the distal end of said elongated tubular body, said connector piece comprising a first frictional surface having at least one first Pressure tab, a second frictional surface having at least one second pressure tab, a collar, and a transparent interior wall which prevents communication of the objects to be viewed between the interior of said elongated tubular body and the interior of said view cup, wherein said first frictional surface frictionally engages said inner surface of said elongated tubular body and said at least one first pressure tab frictionally engages said inner surface of said elongated tubular body and said collar prevents said connector piece from fully entering said elongated tubular body and said second frictional surface frictionally engages said interior surface of said view cup and said at least one second pressure tab frictionally engages said interior surface of said view cup and said collar prevents said connector piece from fully entering said view cup.

8. The kaleidoscope as claimed in claim 7, wherein said elongated tubular body is constructed from a material selected from the group consisting of transparent and translucent materials.

9. The kaleidoscope as claimed in claim 7, wherein said view cup is constructed from a material selected from the group consisting of transparent and translucent materials.

10. The kaleidoscope as claimed in claim 7, comprising two of said pressure tabs on each of said first frictional surface and said second frictional surface.

11. The kaleidoscope as claimed in claim 7, wherein said connector piece is constructed of a material selected from the group consisting of transparent and translucent materials.

12. The kaleidoscope as claimed in claim 7, wherein said pressure tabs extend radially outwardly from said frictional surfaces.

13. The kaleidoscope as claimed in claim 10, wherein said pressure tabs extend radially outwardly from said frictional surfaces and said pressure tabs located on said first frictional surface are located opposite each other relative to said hollow interior of said connector piece and said frictional tabs located on said second frictional surface are located opposite each other relative to said hollow interior of said connector piece.

14. The kaleidoscope as claimed in claim 13, wherein said pressure tabs located on said first frictional surface are angularly offset from said pressure tabs located on said second frictional surface.

* * * * *

UNITED STATES PATENT AND TRADEMARK OFFICE
CERTIFICATE OF CORRECTION

PATENT NO. : 5,229,884
DATED : July 20, 1993
INVENTOR(S) : KELDERHOUSE, Ann M.; Charles D.

It is certified that error appears in the above—identified patent and that said Letters Patent is hereby corrected as shown below:

Column 2, line 31: change "viewed" to -- viewer --.
         line 33: change "viewed" to -- viewer --.

Column 3, line 67: change "component" to -- components --.

Column 4, line 51: change "12" to -- 14 --.
         line 55: change "1c" to -- 14c --.
         line 57: change "1c" to -- 14c --.
         line 60: delete "5"
                  change "1c" to -- 14c --.

Column 5, line 57: change "24" to -- 34 --.

Column 6, line 50: change "tables" to -- tabs --.

Column 7, line 17: change "Pressure" to -- pressure --.

Signed and Sealed this

Fourteenth Day of February, 1995

Attest:

BRUCE LEHMAN

Attesting Officer      Commissioner of Patents and Trademarks